US010324966B2

(12) United States Patent
Raz et al.

(10) Patent No.: US 10,324,966 B2
(45) Date of Patent: Jun. 18, 2019

(54) SEARCH BY EXAMPLE (71) Applicant: MModal IP LLC, Franklin, TN (US)

(72) Inventors: Ariel Raz, Pittsburgh, PA (US); Scott Stimmel, Gibsonia, PA (US)

(73) Assignee: MModal IP LLC, Franklin, TN (US)

(*) Notice: Subject to any disclaimer, the term of this patent is extended or adjusted under 35 U.S.C. 154(b) by 285 days.

(21) Appl. No.: 14/657,322

(22) Filed: Mar. 13, 2015

(65) Prior Publication Data
US 2015/0269221 A1 Sep. 24, 2015

Related U.S. Application Data (60) Provisional application No. 61/968,854, filed on Mar. 21, 2014.

(51) Int. Cl.
*G06F 16/242* (2019.01)
*G06F 16/332* (2019.01)

(52) U.S. Cl.
CPC ...... *G06F 16/3325* (2019.01); *G06F 16/2425* (2019.01)

(58) Field of Classification Search
CPC .................. G06F 16/2425; G06F 16/3325
See application file for complete search history.

(56) References Cited

U.S. PATENT DOCUMENTS

| | | | |
|---|---|---|---|
| 6,671,681 B1 * | 12/2003 | Emens | G06F 17/30646 707/706 |
| 7,379,946 B2 | 5/2008 | Carus | |
| 7,584,103 B2 | 9/2009 | Fritsch | |
| 7,716,040 B2 | 5/2010 | Koll | |
| 8,332,393 B2 | 12/2012 | Elyada | |
| 8,452,793 B2 | 5/2013 | Anick | |
| 2002/0194263 A1 * | 12/2002 | Murren | G06F 8/10 709/203 |

(Continued)

FOREIGN PATENT DOCUMENTS

| | | |
|---|---|---|
| WO | 2007115098 A2 | 10/2007 |
| WO | 2007115098 A3 | 9/2008 |

OTHER PUBLICATIONS

Basu, More Free Google Search Tools You Might Not Be Using So Much, Nov. 26, 2012, accessed Aug. 2, 2017 at http://www.makeuseof.com/tag/free-search-tools-you-might-not-be-using/.*

*Primary Examiner* — William Spieler
(74) *Attorney, Agent, or Firm* — Blueshift IP, LLC; Robert Plotkin (57) ABSTRACT

A computer system uses a search engine to search a dataset using an initial query provided by a user and thereby to produce initial search results. The system enables the user to select portions of the initial search results. The system identifies metadata associated with the selected portions, and displays information representing that metadata in a form that is easily understandable by a person not trained in the annotation system in which the search results are encoded. The user may instruct the system to add one or more of the displayed metadata elements to the initial query, in response to which the system may add the specified metadata elements to the initial query to produce a modified query. The system may search the dataset using the modified query and thereby produce modified search results. The process may be repeated as desired by the user to further refine the search results.

11 Claims, 9 Drawing Sheets

(56) References Cited

U.S. PATENT DOCUMENTS

| | | |
|---|---|---|
| 2003/0097357 A1 | 5/2003 | Ferrari |
| 2004/0220902 A1 | 11/2004 | Gates |
| 2007/0239676 A1* | 10/2007 | Stonehocker ......... G06F 3/0482 |
| 2009/0240683 A1 | 9/2009 | Lazier |
| 2009/0248400 A1 | 10/2009 | Luke |
| 2009/0327267 A1 | 12/2009 | Wong |
| 2010/0005092 A1* | 1/2010 | Matson ............. G06F 17/30646 |
| | | 707/E17.017 |
| 2010/0010984 A1* | 1/2010 | Matias .............. G06F 17/30646 |
| | | 707/E17.014 |
| 2011/0099165 A1 | 4/2011 | Corner |
| 2011/0099190 A1 | 4/2011 | Kreibe |
| 2011/0265177 A1 | 10/2011 | Sokolan |
| 2013/0086110 A1 | 4/2013 | Kruger |

* cited by examiner

FIG. 3C http://www.example.com

Text | Add text
[aneurysm ×]
Add [+ ()]

user@tenant ▸

| Name | Date |
|---|---|
| Details | |
| Name | Date |
| Details | |
| Name | Date |
| Details | |
| Name | Date |
| Details | |
| Name | Date |
| Details | |
| Name | Date |
| Details | |
| Name | Date |
| Details | |
| Name | |

Name — Date — View Document

Parturient Commodo Mollis Tellus
Vestibulum Parturient Lorem — " ...Dolor Pharetra Cursus Tristique..."
Commodo Dapibus — " ...Ullamcorper Pellentesque Dolor..."
Nullam Tellus Nibh Mattis — " ...Inceptos Amet Aenean..."
Condimentum Tortor — " ...Nibh Consectetur Aenean Nullam..."

Aenean Cursus
Porta Adipiscing Tellus — " ...Dolor Tristique Purus..."
AAA — " ...Sem Sollicitudin Ullamcorper..."
Adjung Mollis Quam Aenean — " ...Justo Malesuada Fermentum..."

Searchable Metadata

| | Type | Value |
|---|---|---|
| ☐ | Effective Time | 201203010000 |
| ☑ | Patient | Ryan Stagg |
| ☐ | Encounter | 2.16.840.1.113883.3.1 35.3/1575421792 |
| ☑ | Author | Slanina |
| ☐ | Document | 2.16.840.1.113883.3 135.5/14634854 |
| ☐ | NLP Pipeline | CS.GA.HIM |

[Add selected to query]

FIG. 3F http://www.example.com

Text | Add text
aneurysm × | ? | ▼ AAA × | Add | + ()

| | |
|---|---|
| Name<br>Details | Date |
| Name<br>Details | Date |
| Name<br>Details | Date |
| Name<br>Details | Date |
| Name<br>Details | Date |
| Name<br>Details | Date |
| Name<br>Details | Date |
| Name | Date | user@tenant ▸

Name | Date
--- | ---
 | View Document
Parturient Commodo Mollis Tellus | 
Vestibulum Parturient Lorem | "...Dolor Pharetra Cursus Tristique..."
Commodo Dapibus | "...Ullamcorper Pellentesque Dolor..."
Nullam Tellus Nibh Mattis | "...Inceptos Amet Aenean..."
Condimentum Tortor | "...Nibh Consectetur Aenean Nullam..."
Aenean Cursus | 
Porta Adipiscing Tellus | "...Dolor Tristique Purus..."
AAA | "...Sem Sollicitudin Ullamcorper..."
Adipiscing Mollis Quam Aenean | "...Justo Malesuada Fermentum..."

FIG. 3G

SEARCH BY EXAMPLE

CROSS-REFERENCE TO RELATED APPLICATIONS

This application is related to the following patents, both of which are hereby incorporated by reference herein:
U.S. Pat. No. 7,584,103 B2, entitled, "Automatic Extraction of Semantic Content and Generation of a Structured Document From Speech," issued on Sep. 1, 2009; and
U.S. Pat. No. 7,716,040 B2, entitled, "Verification of Extracted Data," issued on May 11, 2010.

BACKGROUND

Search is one of the most widely implemented and used features in computing systems. In general, a user searches a dataset by providing a query to a search engine, which attempts to find any data in the dataset which matches the query (known as the "search results"), and then returning to the user a representation of the search results, often in the form of a visual summary of each data record in the search results.

Search engines vary widely in the types of queries they are capable of processing. For example, some search engines (such as those commonly used for searching content on the Web) are capable of processing queries written in a natural language, while other search engines permit or require queries to be written in one or more query languages, such as SQL (Structured Query Language) or AQL (Analytics Query Language).

Regardless of the language in which the user expresses a query, a successful search (i.e., a search which produces search results matching criteria intended by the user to be found, with a minimum of false positives and false negatives) requires the user to create a suitable query. This task can be difficult, particularly when (as in all but trivial cases) the user lacks full knowledge of the content and structure of the dataset being searched. As a result, successfully using a search engine to find desired data often involves constructing an initial query based on educated guesses about the content and structure of the dataset being searched, using that query to produce an initial set of search results, manually reviewing the initial set of search results (which may include a large number of both false positives and false negatives), modifying the initial query based on any insights gained from the manual review of the initial set of search results, and then repeating the search process, possibly multiple times, each time with a further refined query. Such a process is tedious, time-consuming, and prone to error.

What is needed, therefore, are improved techniques for constructing queries for use with search engines.

SUMMARY

A computer system uses a search engine to search a dataset using an initial query provided by a user and thereby to produce initial search results. The system enables the user to select portions of the initial search results. In response to the user's selection, the system identifies metadata associated with the selected portions, and displays information representing that metadata in a form that is easily understandable by a person not trained in the annotation system in which the search results are encoded. The user may instruct the system to add one or more of the displayed metadata elements to the initial query, in response to which the system may add the specified metadata elements to the initial query to produce a modified query. The system may search the dataset using the modified query and thereby produce modified search results. The process may be repeated as desired by the user to further refine the search results.

Other features and advantages of various aspects and embodiments of the present invention will become apparent from the following description and from the claims.

DETAILED DESCRIPTION

A computer system uses a search engine to search a dataset using an initial query provided by a user and thereby to produce initial search results. The system enables the user to select portions of the initial search results. In response to that selection, the system identifies metadata associated with the selected portions, and displays information representing that metadata in a form that is easily understandable by a person not trained in the annotation system in which the search results are encoded. The user may instruct the system to add one or more of the displayed metadata elements to the initial query (or otherwise use the displayed metadata element(s) in the initial query), in response to which the system may add the specified metadata elements to the initial query to produce a modified query (or otherwise use the specified metadata element(s) in the initial query to produce the modified query). The system may search the dataset using the modified query and thereby produce modified search results. The process may be repeated as desired by the user to further refine the search results. Search results produced by executing the modified query may include search results containing metadata which did not exist when the initial query was created/executed, and such new metadata may be used to further refine the query using the techniques disclosed herein.

Figure 1:
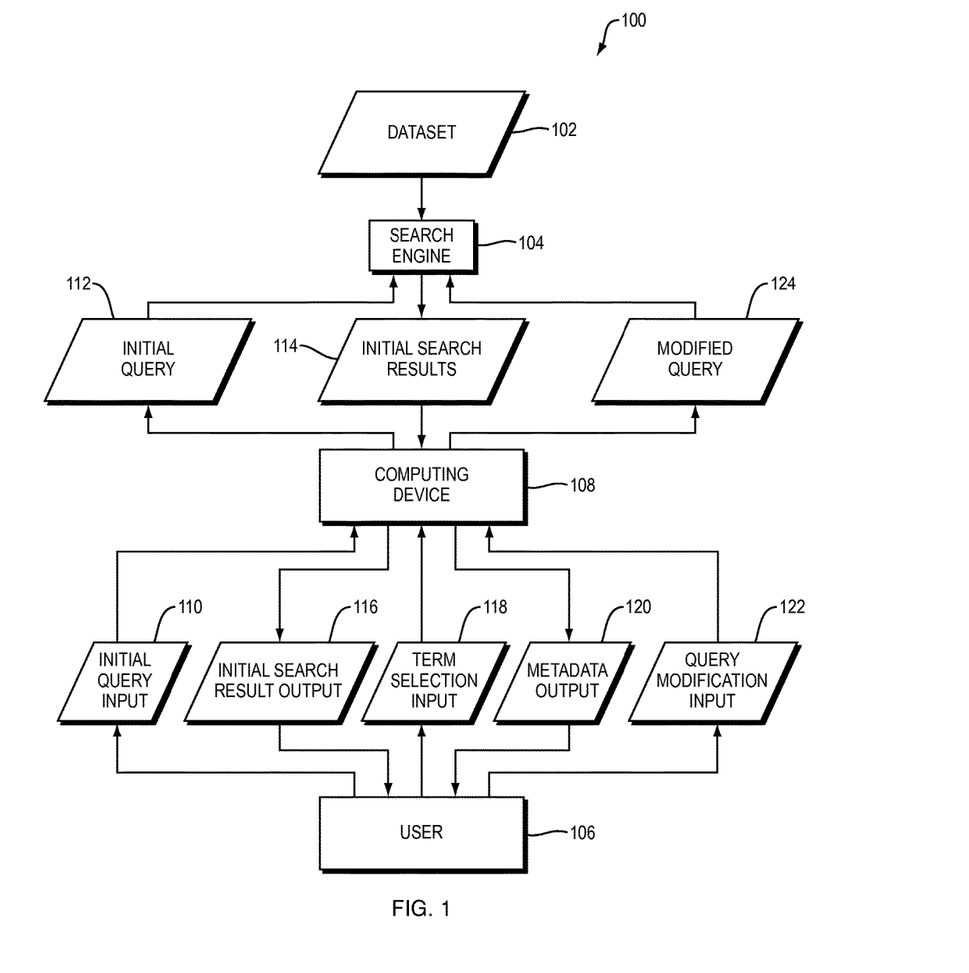
FIG. 1 is a dataflow diagram of a system for refining a query according to one embodiment of the present invention.
Figure 2:
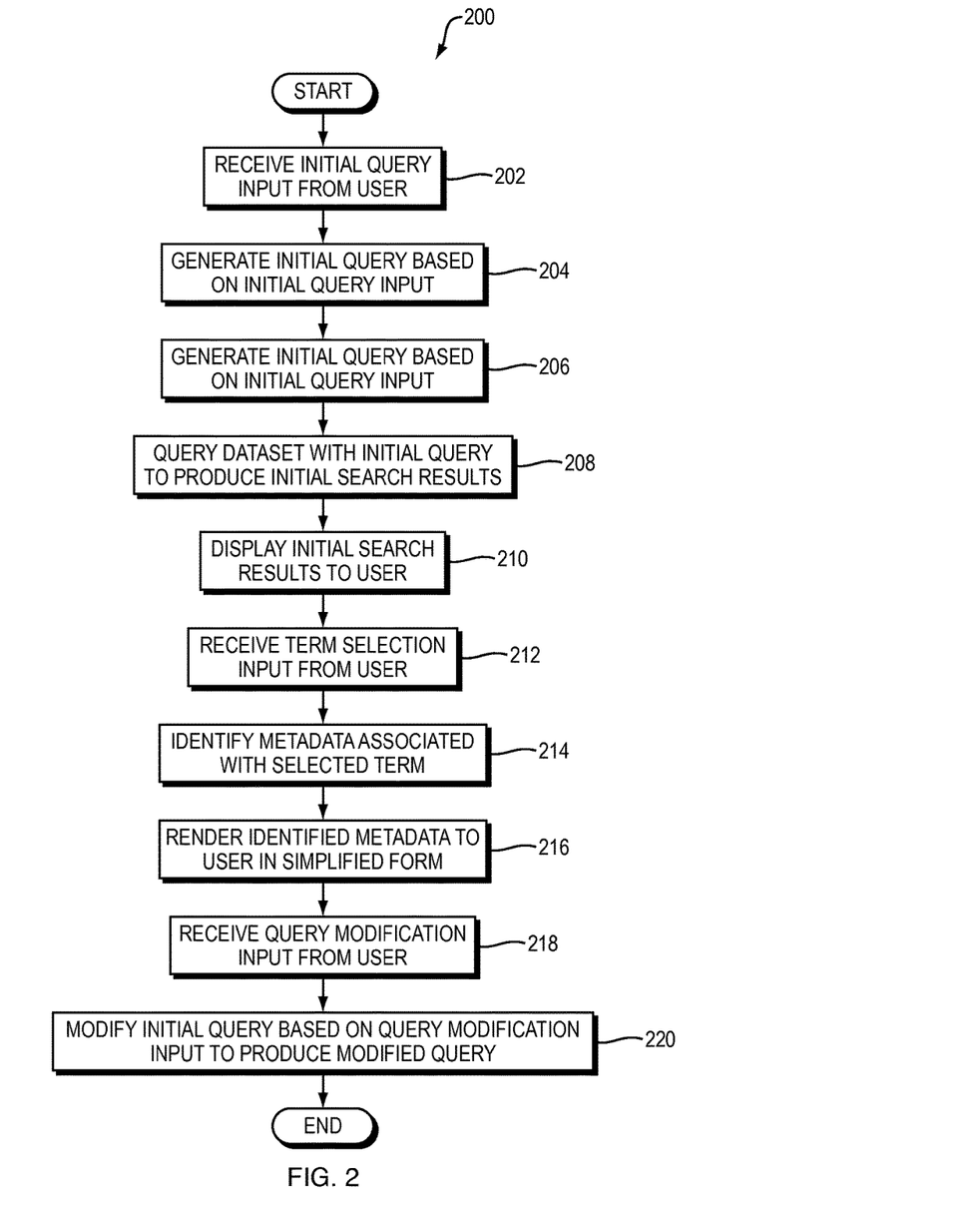
FIG. 2 is a flowchart of a method performed by the system of FIG. 1 according to one embodiment of the present invention.

For example, referring to FIG. 1, a dataflow diagram is shown of a system 100 for refining a query according to one embodiment of the present invention. Referring to FIG. 2, a flowchart is shown of a method 200 performed by the system 100 of FIG. 1 according to one embodiment of the present invention.

The system 100 includes a dataset 102, which is searchable by a search engine 104. The dataset 102 may be any kind of dataset, and may include any one or more of the following, in any combination: electronic health records (EHRs), database records, files in a file system, web content (such as web pages), and messages (such as email messages, text messages, voice messages, and social networking messages). Although some examples of the dataset 102 may be described herein as including healthcare information, these are merely examples and do not constitute limitations of the present invention.

The dataset 102 may include unstructured and/or structured data. Examples of unstructured data include text, such as text that occurs within a word processing document, email message, or text field in an EHR or database record. Examples of structured data include discrete data fields in an EHR or database record (such as fields having values which may be assigned via checkboxes, radio buttons, menu items, or dropdown lists in a graphical user interface) and text (or other content) which has been annotated using metadata, such as tags in a structured language such as XML. Any particular unit of data in the dataset 102 (such as an individual EHR) may include solely structured data, solely unstructured data, or a combination of structured and unstructured data.

Content (i.e., data) which has been annotated using tags in a structured language is an example of what is referred to herein as "encoded content." More generally, encoded content may be any content that is associated with metadata, where the metadata represents a concept. Both the content and associated metadata may be stored in one or more computer-readable media. Data representing an association between the content and associated metadata may also be stored in one or more computer-readable media. Content and associated metadata (such as text and associated XML tags) may, for example, be stored in the same document or record.

A single document or record may include multiple units of encoded content representing different concepts. For example, a single document (e.g., an XML document) may include both: (1) first encoded content in the form of first text and first metadata (e.g., first XML tags), where the first encoded content represents a first concept (e.g., a current condition of a patient); and (2) second encoded content in the form of second text and second metadata (e.g., second XML tags), where the second encoded content represents a second concept (e.g., a current medication of the patient). The first and second metadata may differ from each other. As a result, the first and second concepts may differ from each other.

Encoded content within the dataset 102 may have been encoded using any techniques, such as the techniques disclosed in U.S. Pat. No. 7,584,103, entitled, "Automated Extraction of Semantic Content and Generation of a Structured Document from Speech," issued on Sep. 1, 2009; and U.S. Pat. No. 7,716,040, entitled, "Verification of Extracted Data," issued on May 11, 2010, both of which are hereby incorporated by reference herein.

For ease of explanation, assume that the dataset 102 includes a clinical note written or dictated by a physician, which describes a patient suffering from an aneurysm. For example, the clinical note may include the text, "Patient currently suffers from an aneurysm." Further assume that this text has been encoded with suitable metadata within the clinical note to indicate that the patient who is the subject of the clinical note currently suffers from an aneurysm, such as by annotating the text "aneurysm" with suitable XML tags, such as XML tags defined according to an annotation standard such as any version of SNOMED, ICD, or CPT.

The system 100 also includes a computing device 108 used by a user 106. The computing device 108 may be any kind of computing device, such as a desktop computer, laptop computer, tablet computer, smartphone, or any combination thereof. Although only the single computing device 108 is shown in FIG. 1 for ease of illustration, the user 106 may perform the functions disclosed herein using any number of computing devices, which may be of any kind(s) in any combination.

The user 106 provides input 110, specifying an initial query, to the computing device 108 (FIG. 2, operation 202). The input 110 (and any other input disclosed herein) may take any form, such as a text input, typed using a keyboard, representing the initial query. For example, the user 106 may provide the text string "aneurysm" as the initial input 110. The system 100 may provide any kind of graphical user interface (GUI) to the user 106 to assist the user 106 in providing the initial query input 110 (and any other input disclosed herein).

Figure 3A:
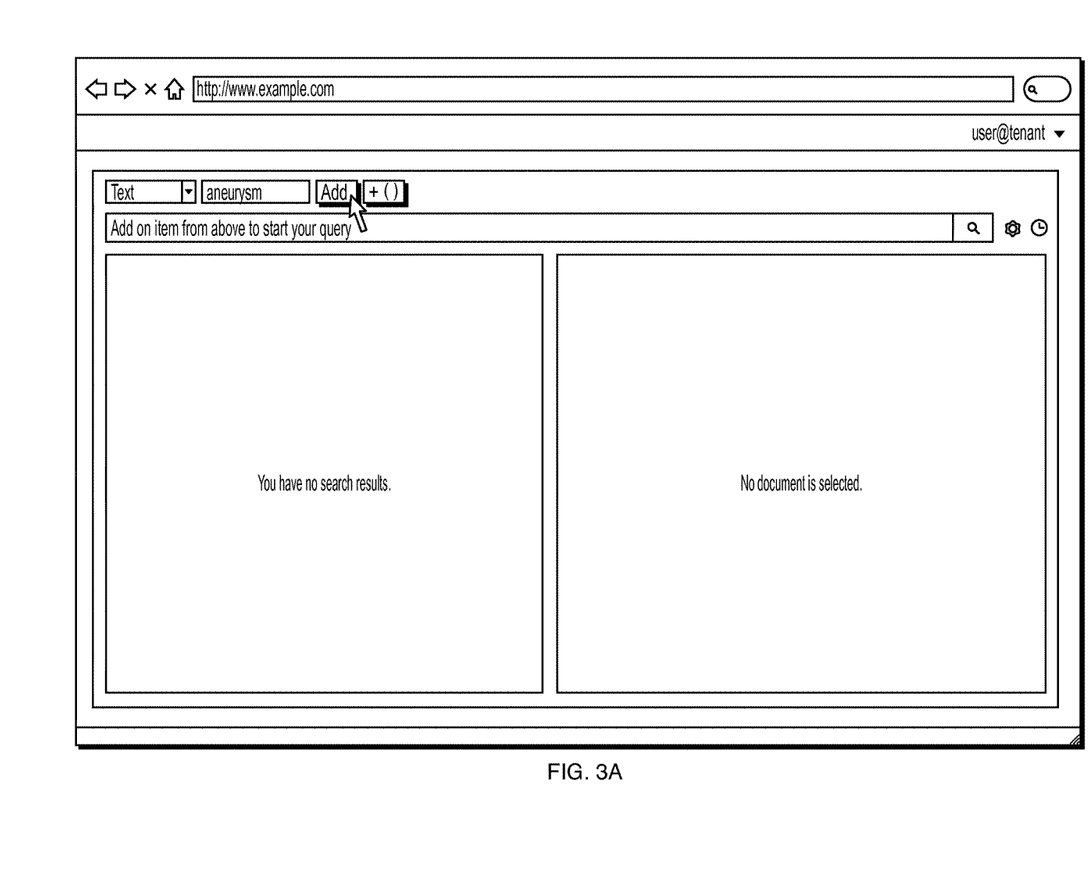
FIGS. 3A-3G are illustrations of a user interface used in conjunction with the system of FIG. 1 and the method of FIG. 2 according to one embodiment of the present invention.

An example of such a GUI is shown in FIG. 3A. The GUI shown in FIG. 3A includes:

- a dropdown list for selecting a type of term to add to the query being constructed (the user 106 has selecting the type "text" in the example of FIG. 3A);
- a user interface element for inputting a term of the selected type (the user 106 has entered the text "aneurysm" in the textbox of FIG. 3A);
- an "add" button, which the user 106 may select to cause the computing device 108 to add the inputted term to the query being constructed (if the user 106 clicks the "add" button in FIG. 3A, the computing device 108 will add the text "aneurysm" to the query being constructed); and
- an "add parentheses" button, which the user 106 may select to cause a pair of parentheses to be added to the query being constructed, thereby allowing the user 106 to override the default order of operations within the query being constructed.

The computing device 108 generates an initial query 112 based on the initial query input 110 (FIG. 2, operation 204). For example, the computing device 108 may simply generate a text string (e.g., "aneurysm") as the initial query 112 based on the initial query input 110. As another example, the computing device 108 may construct a query in a particular query language (e.g., SQL or AQL) based on the initial query input 110. As the latter example illustrates, the computing device 108 may perform a transformation on the initial query input 110 to produce the initial query 112. Such a transformation may enable the user 106 to provide the initial query input 110 in a form that is easily understandable and easily input by a person who is not familiar with the query language in which the query 112 is constructed.

The computing device 108 may provide the initial query 112 to the search engine 104, such as by transmitting the initial query 112 to the search engine 104 over a network (FIG. 2, operation 206). Although the computing device 108 and the search engine 104 are shown as distinct components in FIG. 1, this is merely an example and does not constitute a limitation of the present invention. The search engine 104 may, for example, be contained within the computing device 108, in which case operation 206 of FIG. 2 may be performed internally within the computing device 108.

The search engine 104 queries the dataset 102 with the initial query 112 to produce initial search results 114 (FIG. 2, operation 208). The search engine 104 may use any techniques to query the dataset 102. The initial search results 114 may contain any subset of the dataset 102 and/or any data derived from the dataset 102 based on the initial query 112. If, for example, the dataset 102 includes a plurality of documents, then the initial search results 114 may include (or include references to) a subset of the plurality of documents, or portions thereof.

The initial search results 114 may include content (i.e., data) and metadata associated with that content. For example, the initial search results 114 may be a document, or a portion of a document. The document, or document portion, may include first content (e.g., text) and first associated metadata (e.g., first XML tags). The document, or document portion, may include second content (e.g., text)

and second associated metadata (e.g., first XML tags). More generally, the document, or document portion, may include any number of content elements and associated metadata. The document, or document portion, may also include content (e.g., text) that is not associated with any metadata.

Figure 3B:
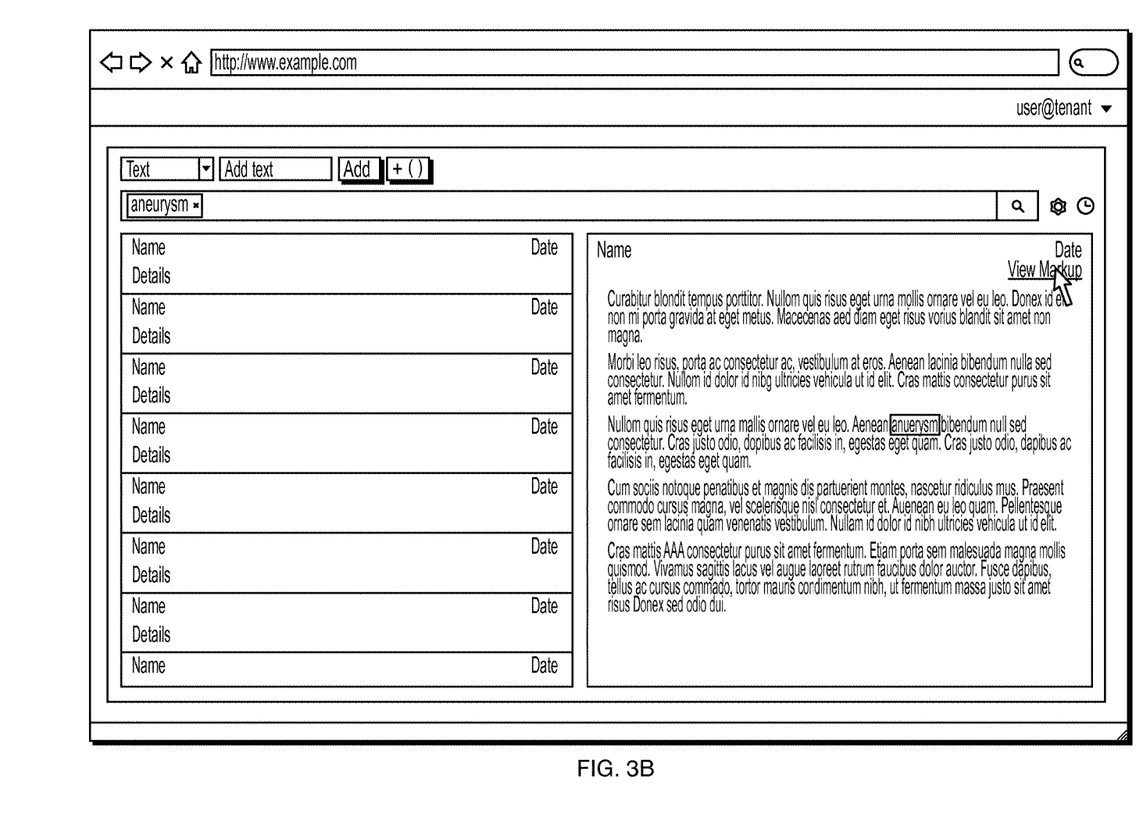

The computing device 108 produces output 116 representing some or all of the initial search results, and provides such output 116 to the user (FIG. 2, operation 210). Such output 116 may take any form, such as visual output, auditory output, or any combination thereof. One example of output representing the initial search results is shown in the user interface of FIG. 3B. In the example of FIG. 3B, the column on the left side lists documents in the initial search results 114. Each such document is represented by a summary containing the name, date, and key details of that document (such as portions of the document matching the initial query 112). The user 106 may select the summary of a particular document in the list to cause the computing device 108 to render the selected document in more detail on the right side of the user interface (such as by rendering the full text of the selected document, with the ability to scroll through the selected document if it is too large to fit on the screen). In the example of FIG. 3B, the user 106 has selected the first document in the list, thereby causing the computing device 108 to display a rendering of that document on the right side of the user interface.

Assume, for purposes of example, that the initial search results 114 include a plurality of (partially or entirely) structured documents, such as XML documents containing concepts which have been encoded according to an annotation standard, such as SNOMED. For example, assume that multiple such documents include the word "aneurysm," and that some instances of the word "aneurysm" in the initial search results 114 have been encoded as a current condition of the patient who is the subject of the containing document, whereas other instances of the word "aneurysm" in the initial search results 114 have been encoded as other concepts, such as a past condition of the patient or a condition of a person other than the patient.

As shown in the example user interface of FIG. 3B, the computing device 108 may render the initial search result output 116 to the user 106 to include text which represents content (e.g., text) in the initial search results, but not to include at least some of the metadata (e.g., XML tags) associated with that content. For example, the document rendering on the right side of FIG. 3B does not include any XML tags contained within the document represented by that rendering. One benefit of rendering the initial search result output 116 in this way is to make the initial search result output 116 (e.g., as represented in the user interface of FIG. 3) easy for the user 106 to comprehend, particularly if the user 106 is not trained to understand the annotation system (e.g., SNOMED) that has been used to annotate the initial search results 114.

The lack of such annotations (which are a kind of metadata) in the rendition of the initial search result output 116, however, has disadvantages. For example, the mere occurrence of the term "aneurysm" in the initial search result output 116 does not necessarily indicate that the patient who is the subject of the document containing that instance of the term "aneurysm" currently has the condition of an aneurysm. Any particular occurrence of the term "aneurysm" in the initial search result output 116 may, for example, refer to a past condition of the patient or to a condition of a person other than the patient. As this example illustrates, the mere occurrence, in the initial search result output 116, of a term which matches the query input 110 provided by the user 106 does not necessarily indicate that the term indicates the presence of the concept for which the user 106 intended to search.

Conventional systems address this problem by enabling the user 106 to cause the entirety of the underlying search results 114 to be displayed, including all of the annotations (e.g., XML tags and/or other metadata) contained therein. In such systems, the user 106 may then manually review the annotations in an attempt to determine which concepts are represented by particular terms in the text (e.g., "aneurysm"). Although such a process may enable the user 106 to eventually identify the concepts represented by particular terms in the search results 114, such a process is tedious and time-consuming, and requires the user 106 to be trained to understand the annotation system in which the search results 114 have been encoded. Such systems, therefore, are not useful for users, such as the average physician, who is not trained to understand such annotation systems.

Embodiments of the present invention address this problem by enabling metadata (e.g., annotations) contained within the initial search results 114 to be displayed to the user 106 in a form that is easily understood by the user 106, even if the user 106 is not trained to understand the metadata (e.g., XML tags and/or other annotations) that have been used to encode concepts within the initial search results 114. To cause such metadata to be displayed, the user 106 may provide, to the computing device 108, input 118 selecting one or more terms in the initial search results 114 (or any portion(s) of the initial search results 114) (FIG. 2, operation 212). The selected term may, for example, be a word, a set of (contiguous or non-contiguous) words, a sentence, a paragraph, or a section. To assist the user 106 in identifying terms in the search results 114 which have associated metadata, the computing device 108 may highlight such terms in the search result output 116, such as by underlining such terms.

The user 106 may provide the term selection input 118 in any way, such as by clicking on or hovering over output representing the term(s) desired to be selected in the user interface of FIG. 3B. Although the term selection input 118 may select any number of terms, the following description will refer to selection of a single term for ease of explanation. In the example of FIG. 3B, the user 106 has provided the term selection input 118 by highlighting the term "aneurysm" in the document rendering on the right side of the user interface. The user 106 may also click on a "View Markup" link.

In response to receiving the term selection input 118 (such as the selection of the term "aneurysm" and clicking on the "View Markup" link), the computing device 108 identifies metadata (e.g., XML tags and/or other annotations) associated with the selected term (FIG. 2, operation 214). The computing device 108 may identify the associated metadata in any of a variety of ways. For example, when rendering the initial search result output 116 (e.g., in the user interface of FIG. 3B), the computing device 108 may store a mapping between displayed terms in the initial search result output 116 and corresponding content (including metadata) in the initial search results 114. As a result, when the user 106 provides the term selection input 118, the computing device 108 may use the stored mapping to identify the metadata in the initial search results 114 associated with the term selected by the user 106.

Figure 3C:
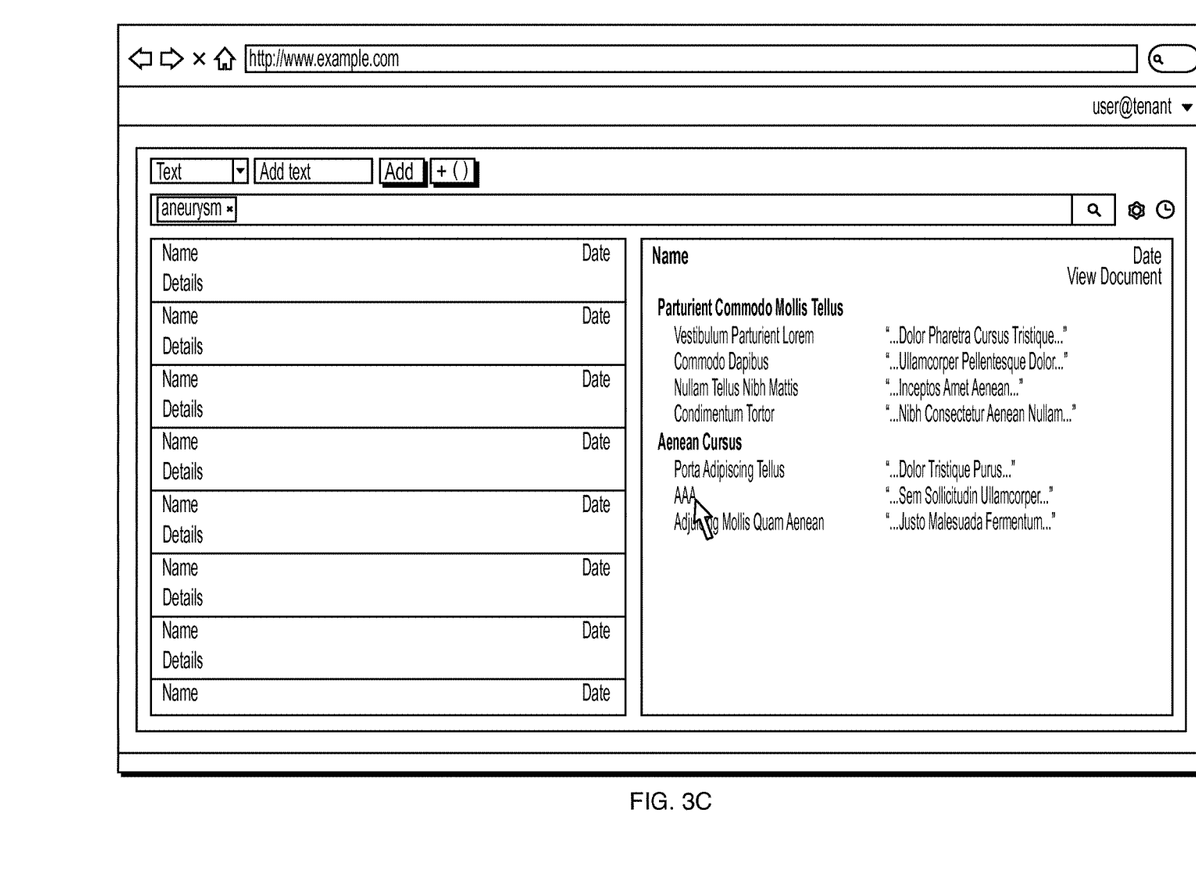

Once the computing device 108 has identified the associated metadata, the computing device 108 renders the identified metadata to the user 106 in a simplified form in the form of metadata output 120 (FIG. 2, operation 216). An example of such a rendering of the identified metadata is shown in the user interface of FIG. 3C. The metadata output 120 may be "simplified" in any of a variety of ways. For example, the metadata output 120 may omit some of the identified metadata, such as some or all of each of one or more of the annotations within the identified metadata. In other words, the computing device 108 may render less than all of the identified metadata in the metadata output 120. As another example, the computing device 108 may derive the metadata output 120 from the identified metadata, such as by adding content (e.g., text and/or images) not contained within the identified metadata, so that the metadata output 120 includes the content (e.g., text and/or images) not contained within the identified metadata. For example, the computing device 108 may map one or more elements (e.g., annotations or components of annotations) of the identified metadata to textual descriptions of such elements which are intended to be more easily understandable by a user who is not trained to understand such elements directly, and then display such textual descriptions within the metadata output 120, either instead of or in addition to output representing the identified metadata itself. As a particular example, the computing device 108 may render a SNOMED annotation indicating that the annotated text is a current condition of the patient by displaying the text "current condition" to the user 106, even though the text "current condition" does not occur within the SNOMED annotation itself. As this example illustrates, the metadata output 120 may include content (e.g., the text "current condition") which represents the identified metadata, but not include the identified metadata itself (e.g., the SNOMED annotation).

In addition to displaying information derived from metadata associated with the selected term, the computing device 108 may display other information related to such metadata. For example, the metadata output 120 may include output indicating, for particular metadata (e.g., a particular XML tag), the number and/or percentage of documents in the dataset 102 in which that annotation appears, and the number and/or percentage of documents in the dataset 102 in which related annotations (e.g., parent and/or child annotations in an annotation hierarchy) appear.

The user 106 may review the metadata output 120 and provide input 122 representing an instruction to modify the initial query 112 based on some or all of the metadata output 120 (FIG. 2, operation 218). For example, the input 122 may represent an instruction to add some or all of the metadata (e.g., XML tags and/or other annotations) represented by the metadata output 120 to the initial query 112, such as by appending such metadata to the initial query 112 and conjoining such metadata with the initial query 112 using a Boolean AND operator. One example of metadata that the user 106 may specify via the query modification input 122 is one or more foreign keys in a relational database, in which case the initial query 112 and/or modified query 124 may be specified using Structured Query Language (SQL).

Figure 3D:
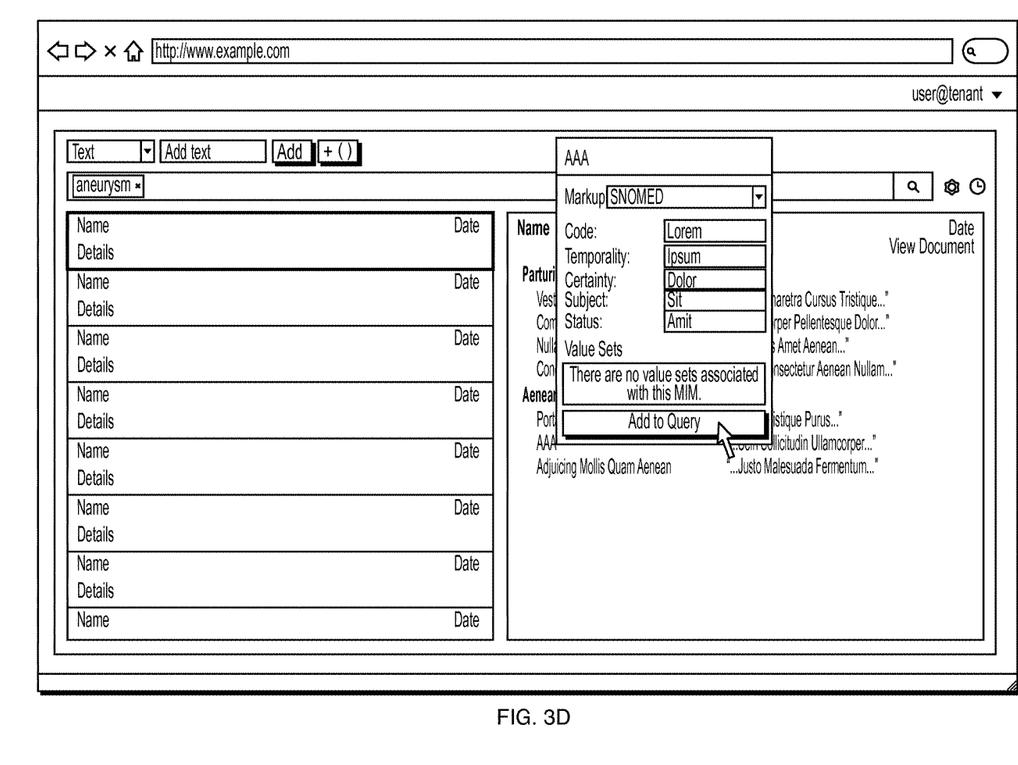
Figure 3E:
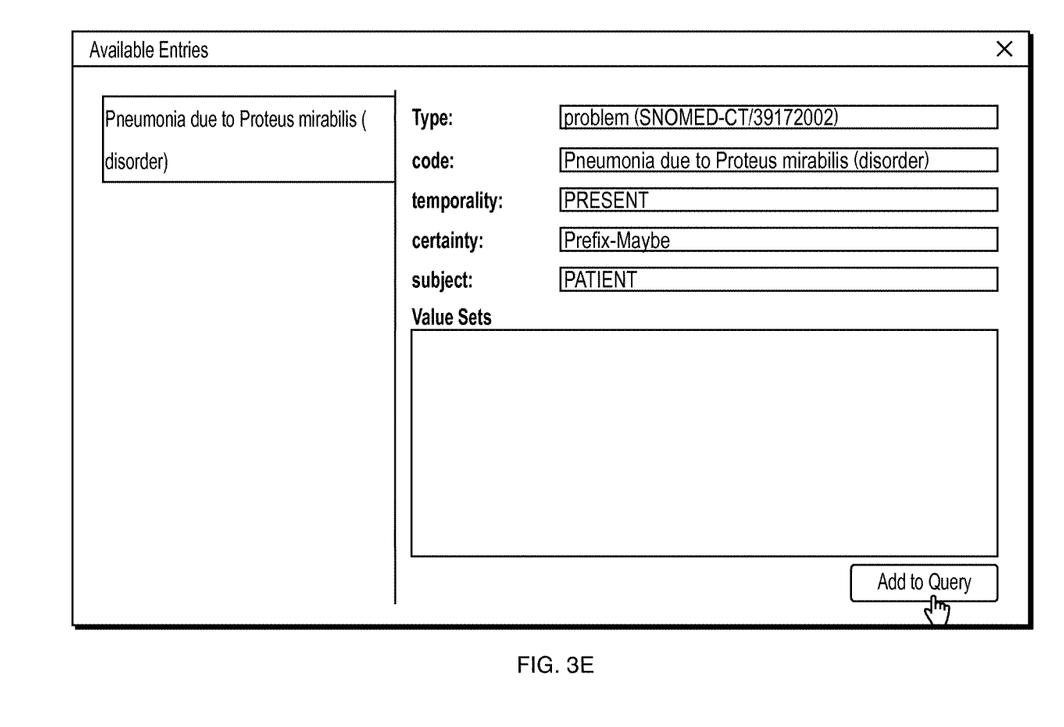

As shown in the example user interface of FIG. 3D, the user 106 may provide the query modification input 122 in any of a variety of ways, such as by clicking on an "Add to Query" menu item after hovering over or selecting particular metadata which the user 106 desires to add to the initial query 112. FIG. 3E shows an alternative example, in which the computing device 108 display various elements of the metadata represented by the metadata output 120, such as: (1) the SNOMED type of the metadata (in the "Type" field); (2) the code of the metadata (in the "code" field); (3) the "temporality" of the metadata (in the "temporality" field); (4) the certainty of the metadata (in the "certainty" field); and (5) the subject of the metadata (in the "subject" field). As illustrated by FIG. 3E, the computing device 108 may display elements of the identified metadata in a form which is easily understandable to a user who is not trained to understand the underlying annotation standard (e.g., SNOMED).

Figure 3F:
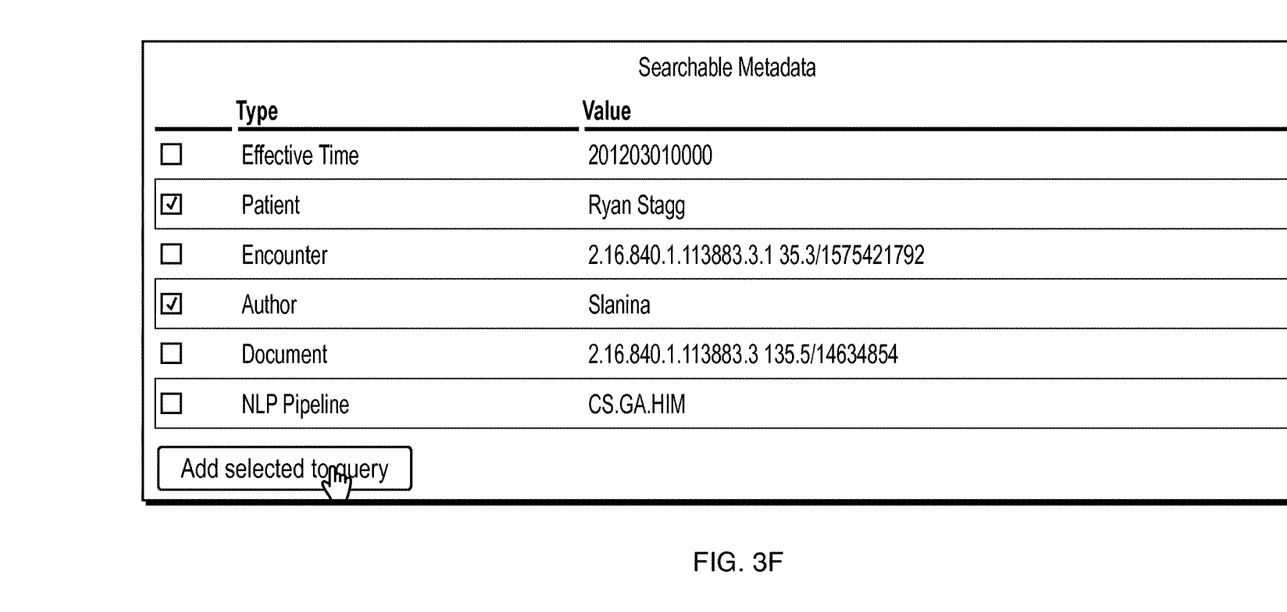

FIG. 3F shows yet another example, in which the computing device 108 displays various elements of searchable metadata, within the currently-selected document, to the user 106. In the example of FIG. 3F, such searchable metadata includes effective time, patient, encounter, author, document and NLP pipeline. The user 106 may provide input selecting any one or more of such elements of metadata. In the example of FIG. 3F, the user 106 has selected patient and author. The user 106 may then provide input instructing the computing device 108 to add the selected elements of metadata to the query under construction, such as by clicking on an "Add selected to query" button. In response to receiving such input, the computing device 108 may add the selected elements of metadata to the query under construction.

In response to receiving the query modification input 122, the computing device 108 may modify the initial query 112 based on the query modification input 122 to produce a modified query 124 (FIG. 2, operation 220). If, for example, the initial query 112 is written in a query language such as AQL, the computing device 108 may modify the initial query 112 by modifying the AQL of the initial query 112 to reflect the query modification input 122. The computing device 108 may use any of the techniques described above in connection with generation of the initial query 112 to generate the modified query 124.

Figure 3G:
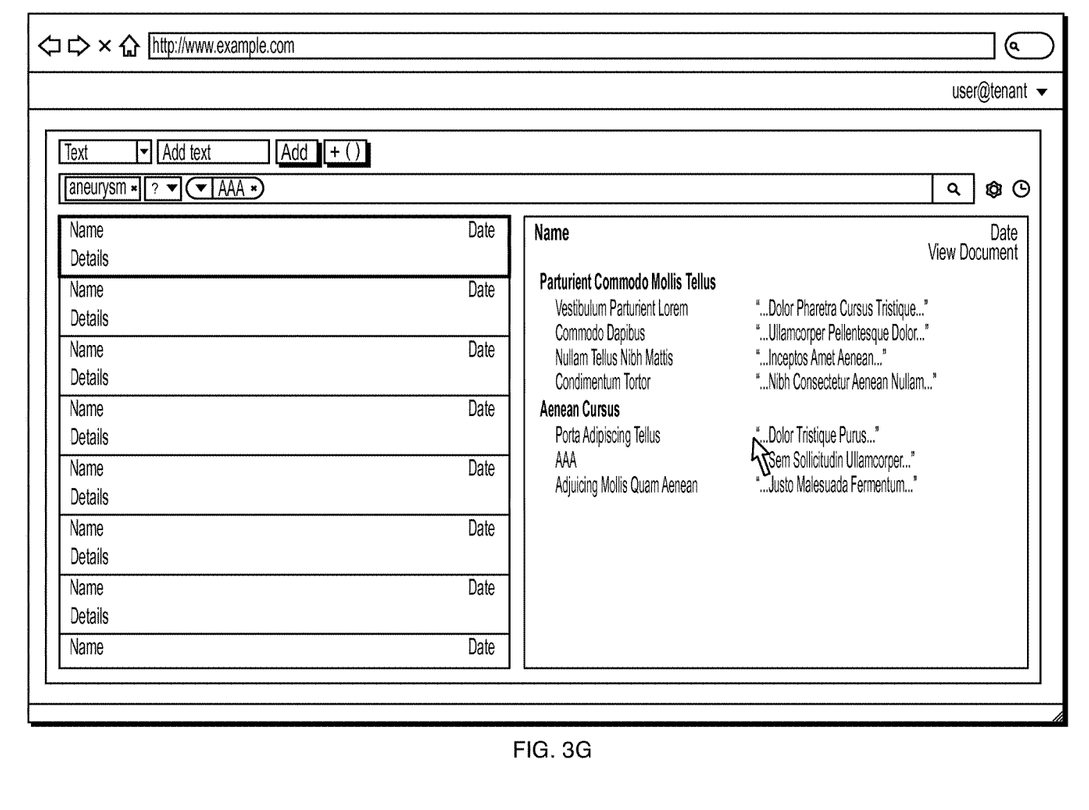

The computing device 108 may display a preview of the modified query 124 to the user 106. For example, if the query modification input 122 represents an instruction to add the annotation "current condition" to the term "aneurysm," the computing device 108 may display a preview of the modified query 124 as "<text>aneurysm AND <current condition>=aneurysm." An example is shown in FIG. 3G, in which the user 106 has added metadata representing a fictional SNOMED annotation named "AAA" to the query. As shown in FIG. 3G, the user interface of FIG. 3G displays a user-friendly representation of the modified query 124 as containing the annotation "AAA" in addition to the original "aneurysm" text. As this example illustrates, the representation of the modified query 124 that is displayed by the computing device 108 to the user 106 may be expressed in a user-friendly form, such as a form which is not expressed in AQL or other underlying query language in which the modified query 124 is represented. The computing device 108 may, however, display the modified query 124 to the user in the form of a statement expressed in AQL (or another query language). For example, the user 106 may provide input, such as clicking on an "Advanced Search" button, in response to which the computing device 108 may display the underlying AQL of the modified query 124 to the user 106.

The user 106 may then manually edit such a preliminary modified query using any technique to produce a final version of the modified query 124. Furthermore, if the metadata that has been added by the user 106 to the modified query 124 has parameters, then the computing device 108 may enable the user 106 to specify conditions (e.g., upper and/or lower limits) to apply to the values of such parameters for inclusion in the modified query 124. The computing device 108 may also enable the user 106 to edit the modified query 124 in other ways, such as by adding, editing, and rearranging Boolean operators (e.g., AND, OR, NOT, and XOR) within the modified query 124 and by adding, editing, and rearranging the order of terms and parentheses within the modified query 124. Any modifications made by the user 106 to the modified query 124 by providing input to a user interface may be translated by the computing device 108 into appropriate corresponding modifications in the underlying modified query 124, such as by modifying the AQL (or other query language) elements of the modified query 124.

In the example described above, the selected term is the single word, "aneurysm," and the metadata associated with that term is an annotation indicating that the term "aneurysm" represents a current condition of the patient who is the subject of the document containing the term "aneurysm." As another example, if the user 106 selects (via the term selection input 118) a portion (i.e., some but less than all) of one of the initial search results 114 (such as a "Current Conditions" section of a document in the initial search results 114), the computing device 108 may identify metadata associated with the selected portion (such as an annotation identifying the selected portion as the "Current Conditions" section of the document), and include the identified metadata in the modified query 124. If such metadata is added to the modified query 124 by conjoining that metadata to the modified query 124 with a Boolean AND operator, then the executing the modified query 124 will cause the search engine 104 to produce only search results in which the term "aneurysm" appears within the "Current Conditions" section of a document. This is merely one example of a way in which metadata associated with a "concept" (as that term is used, e.g., in the above-referenced U.S. Pat. Nos. 7,584,103 and 7,716,040) may be identified by the computing device 108 and incorporated into the modified query 124.

Although not shown in FIG. 1 or 2, the computing device 108 may provide the modified query 124 to the search engine 104, which may execute the modified query 124 on the dataset 102 to produce modified search results, which the computing device 108 may then provide to the user 106 in any of the ways previously described herein. The method 200 of FIG. 2 may be repeated any number of times desired by the user 106 until satisfactory search results have been obtained. Search results produced by executing the modified query 124 may include search results containing metadata which did not exist when the initial query 112 was created/executed, and such new metadata may be used to further refine the modified query 124 using the techniques disclosed herein.

Embodiments of the present invention have a variety of advantages. For example, embodiments of the present make it easier for users to refine queries by displaying existing metadata in search results to the users and by enabling users to incorporate such metadata into future queries. Furthermore, embodiments of the present invention display such metadata to users in easily understood forms. These features eliminate the need for the user to read and understand the metadata (e.g., annotations) directly, thereby simplifying the query generation process for sophisticated users and enabling even users who are not trained to understand the metadata to use such metadata to refine queries.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the dataset 102 may include thousands, millions, or more data elements, and the search engine 104 may search the dataset 102 using the initial query 112 in a relatively short amount of time, such as less than 1 second, less than 10 seconds, or less than one minute. It would be impossible for a human, unaided by a computer, to perform such a search in an amount of time that would produce any practical benefit. As a result, such a search is only practically implementable using a computer and, therefore, for all practical purposes, inherently requires a computer.

As just another example, the output represented by the various example user interfaces in FIGS. 3A-3G is generated by one or more computers (such as the computing device 108). Such output may only practically be generated using a computer. Although it might be possible, in theory, for a person to generate certain elements of such output manually (e.g., using pencil and paper), any attempt to implement the user interfaces of FIGS. 3A-3G manually (i.e., without the use of a computer) in connection with datasets of a realistic size would fail to produce any results, much less results having a practical use, within any reasonable amount of time, effort, and cost. As a result, such user interfaces are only practically implementable using a computer and, therefore, for all practical purposes, inherently require a computer.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which are lacking in the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

What is claimed is:

1. A method performed by at least one computer processor executing computer program instructions stored on at least one non-transitory computer-readable medium, the at least one computer processor using a search engine, and the method comprising:
(A) receiving, by the at least one processor, an initial query input from a user, through a user interface, defining an initial query;
(B) executing, by the at least one processor, the initial query on a dataset to produce initial search results, the initial search results including a first content and a first metadata associated with the first content;
(C) rendering, by the at least one processor, in the user interface, an initial search result output, based on the initial search results, to the user for selecting one or more terms from a plurality of terms displayed in the initial search result output, wherein the initial search result output includes the first content and excludes the first metadata, wherein the first content comprises a first text in an XML document, and wherein the first metadata comprises an XML tag, in the XML document, associated with the first text;
(D) storing, by the at least one processor, a mapping between each of the plurality of terms displayed in the initial search result output and the corresponding first content and first metadata of the initial search results;
(E) identifying, based on the stored mapping, by the at least one processor, at least some of the first metadata in the initial search results, wherein the at least some of the first metadata is associated with the one or more terms selected by the user;
(F) rendering, by the at least one processor, in the user interface, data to represent the first identified metadata in the initial search results in a simplified form to the user, thereby producing rendered first metadata, wherein the rendered first metadata includes content which is not contained within the first metadata;
(G) receiving, by the at least one processor, via the user interface, query modification input from the user, wherein the query modification input includes a term selection input, and wherein the query modification input represents an instruction to use a portion of the rendered first metadata in the initial query;
(H) modifying, by the at least one processor, the initial query to include the first metadata in the initial query, thereby producing a modified query, wherein modifying the initial query facilitates refinement of the initial query to generate specific search results;
(I) executing the modified query on the dataset to produce modified search results; and
(J) providing, by the at least one processor, the produced modified search results on the user interface.

2. The method of claim 1, wherein (F) comprises rendering less than all of the first metadata.

3. The method of claim 1, wherein (F) comprises adding, to the rendered first metadata, content that is absent in the first metadata.

4. The method of claim 1, wherein the rendered first metadata comprises text.

5. The method of claim 1, wherein (A) comprises performing a transformation on the initial query input to produce the initial query.

6. The method of claim 1, wherein (G) further comprises receiving, by the at least one processor, term selection input identified responsive to receiving an indication of a portion of the rendered first metadata with which the user interacted via the user interface.

7. A non-transitory computer-readable medium storing computer program instructions executable by at least one computer processor to perform a method, the at least one computer processor using a search engine, and the method comprising:
(A) receiving an initial query input, by the at least one processor, from a user, through a user interface, defining an initial query;
(B) executing the initial query on a dataset, by the at least one processor, to produce initial search results, the initial search results including a first content and a first metadata associated with the first content;

(C) rendering an initial search result output, by the at least one processor, in the user interface, based on the initial search results, to the user for selecting one or more terms from a plurality of terms displayed in the initial search result output, wherein the initial search result output includes the first content and excludes the first metadata, wherein the first content comprises a first text in an XML document, and wherein the first metadata comprises an XML tag, in the XML document, associated with the first text;

(D) storing, by the at least one processor, a mapping between each of the plurality of terms displayed in the initial search result output and the corresponding first content and first metadata of the initial search results;

(E) identifying, based on the stored mapping, at least some of the first metadata in the initial search results, by the at least one processor, wherein the at least some of the first metadata is associated with the one or more terms selected by the user;

(F) rendering, in the user interface, data to represent the first identified metadata in the initial search results, by the at least one processor, in a simplified form to the user, thereby producing rendered first metadata, wherein the rendered first metadata includes content which is not contained within the first metadata;

(G) receiving, via the user interface, query modification input from the user, by the at least one processor, wherein the query modification input includes a term selection input, and wherein the query modification input represents an instruction to use a portion of the rendered first metadata in the initial query;

(H) modifying the initial query, by the at least one processor, to include the first metadata in the initial query, thereby producing a modified query, wherein modifying the initial query facilitates refinement of the initial query to generate specific search results;

(I) executing the modified query on the dataset to produce modified search results; and (J) providing, by the at least one processor, the produced modified search results on the user interface.

8. The non-transitory computer-readable medium of claim 7, wherein (F) comprises rendering less than all of the first metadata.

9. The non-transitory computer-readable medium of claim 7, wherein (F) comprises adding, to the rendered first metadata, content that is absent in the first metadata.

10. The non-transitory computer-readable medium of claim 7, wherein the rendered first metadata comprises text.

11. The non-transitory computer-readable medium of claim 7, wherein (A) comprises performing a transformation on the initial query input to produce the initial query.

* * * * *